United States Patent [19]
McCarthy et al.

[11] Patent Number: 5,319,064
[45] Date of Patent: Jun. 7, 1994

[54] THERMOTROPIC LIQUID CRYSTALLINE POLY(ESTER-AMIDES)

[75] Inventors: Thomas F. McCarthy, Ware; Robert W. Lenz, Amherst; Simon W. Kantor, Agawam, all of Mass.; Ki-Soo Kim, Katonah, N.Y.; Sophia Dashevsky, Fair Lawn, N.J.

[73] Assignees: Univ. of Mass. at Amherst, Amherst, Mass.; Akzo N.V., Arnhem, Netherlands

[21] Appl. No.: 957,321

[22] Filed: Oct. 6, 1992

[51] Int. Cl.$^5$ .................. C08C 63/00; C08C 69/44
[52] U.S. Cl. .................. 528/190; 528/176; 528/184; 528/191; 528/193; 528/194; 525/425; 525/432
[58] Field of Search ........... 528/176, 184, 190, 193, 528/191, 194; 525/425, 432

[56] References Cited

U.S. PATENT DOCUMENTS

| | | | |
|---|---|---|---|
| 4,900,802 | 2/1990 | Quentin | 528/191 |
| 4,950,730 | 8/1990 | Quentin | 528/191 |
| 5,070,155 | 12/1991 | Liu et al. | 525/432 |
| 5,147,962 | 9/1992 | Tanisake et al. | 528/194 |
| 5,162,484 | 11/1992 | Judas | 528/194 |

OTHER PUBLICATIONS

A. C. Griffin et al., "Mesogenic Polymers. 5. Thermotropic Polyamide Liquid Crystals and Analogous Small Molecule Diamides", Mol. Cryst. Liq. Cryst., vol. 82 (Letters), pp. 145-150 (1982).
H. Ringsdorf et al., "Synthesis, Structure, and Phase Behaviour of Liquid-Crystalline Rigid-Rod Polyesters and Polyamides with Disc-Like Mesogens in the Main Chain", Makromol. Chem. 188, 1431-1445 (1987).
J. M. G. Cowie et al., "Thermotropic Liquid Crystalline Main-Chain Polyamides Containing Diaza-18-Crown-6-Ether Units", British Polymer Journal, vol. 20, No. 6, 1988, pp. 515-519.
M. Schmucki et al., "Strictly Alternating Polyamides with Stiff and Flexible Chain Segments: Effects on Thermotropic Liquid Crystallinity of the Introduction of an Ethylene Unit into the Mesogenic Group", Makromol. Chem. 190, 1303-1308 (1989).
T. Uryu et al., "Thermotropic Liquid-Crystalline Copoly(ester amide)s and Copolyamides Containing a Flexible Spacer in the Main Chain", Polymer Journal, vol. 21, No. 12, pp. 977-986 (1989).
D. Liu et al., "Study on Sequence of Thermotropic Liquid Crystalline Polyesteramides", Polymer Preprints, vol. 33, No. 2, Aug. 1992, pp. 248-249.
CA 116(4): 129769a; Fu et al.
CA 110(18): 155114d; Sek et al.
CA 107(26): 237672m; Sek et al.

*Primary Examiner*—John Kight, III
*Assistant Examiner*—P. Hampton-Hightower
*Attorney, Agent, or Firm*—Richard P. Fennelly; Louis A. Morris

[57] ABSTRACT

Thermotropic liquid crystalline poly(ester-amide) compositions are disclosed which comprise a bis(4-carbonyl phenylene) terephthalate unit and a unit derived from an N-substituted hydrocarbylenediamine (e.g., one derived from an N,N-dialkylalkylene).

16 Claims, No Drawings

THERMOTROPIC LIQUID CRYSTALLINE POLY(ESTER-AMIDES)

BACKGROUND OF THE INVENTION

Lyotropic liquid crystalline polyamides, such as poly(p-phenylene terephthalamide), which are exemplified by such commercially available products as TWARON polyamide and KEVLAR polyamide, exhibit liquid crystalline properties in solution.

Polymers which demonstrate liquid crystalline properties in the melt, and which are referred to as thermotropic liquid crystalline polymers, have been limited chiefly to poly(esters) such as VECTRA brand polyester. In general, aromatic polyamides have not demonstrated thermotropic behavior due to their extremely high melting points as a result of intermolecular hydrogen bonding and the rigidity of the aromatic mesogen which is necessary to convey liquid crystalline properties. Consequently decomposition occurs before melting. There have been a few examples of amide-containing thermotropic liquid crystalline polymers in the literature which have either large flexible spacers or have large substituents to lower the melting temperature of the polymer. Some examples of such polymers include:

1. J. M. G. Cowie et al., in British Polymer Journal, 20, 515–519 (1988) shows thermotropic liquid crystalline main chain polyamides containing diaza-18-crown-6-ether units.

2. M. Schmucki et al., in Makromol. Chem. 190, 1303–1308 (1989) show polyamides with stiff and flexible chain segments which are formed by reaction of a dicarbonyl dichloride, optionally containing a short alkylene bridge group between the phenyl rings with an ortho-substituted α,ω-bis(4-aminophenyl) alkylene monomer.

3. A. C. Griffin et al., in Mol. Cryst. Liq. Cryst. Vol. 82 (Letters), pp. 145–150, shows thermotropic polyamide liquid crystalline materials formed from the polymerization of 4,4'-dichloroformyl-1,10-diphenoxydecane and a 3,3'-disubstituted-4,4'-diaminobiphenyl monomer.

4. Uryu et al., polymer Journal, Vol. 21, No. 12, pp. 977–986 (1989), describes thermotropic liquid crystalline copoly(ester-amides) which are formed from 4,4'-diacetoamido-3,3'-dimethoxybiphenyl or 4,4'-diacetoamido-3,3'-dichlorobiphenyl and diacetylated p-phenylenediamine, in combination.

5. H. Ringsdorf et al., in Makromol. Chem. 188, 1431–1445 (1987), illustrate liquid crystalline rigid-rod polyesters and polyamides containing disk-like mesogens in the main chain which are derived from discoid 1,4-hydroquinone derivatives.

U.S. Pat. No. 5,070,155 to M. Liu et al. describes semi-aromatic copolyamide or copolyesteramides which are prepared from an aliphatic polyamide and an aromatic hydroxyacid or aminoacid.

D. Liu et al. in Polymer Preprints, Vol. 33, No. 2 (August 1992), indicate that thermotropic aromatic-aliphatic polyesteramides can be formed based on p-terephthaloyl chloride, dimethylbenzidine, and hexylene glycol.

SUMMARY OF THE INVENTION

The present invention relates to thermotropic poly(ester-amides) which comprise a bis(4-carbonyl phenylene) terephthalate unit and a unit derived from an N-substituted alkylenediamine, e.g., one derived from an N,N-dialkylalkylenediamine.

DETAILED DESCRIPTION OF THE INVENTION

The bis(4-carbonyl phenylene) terephthalate unit for the thermotropic poly(ester-amide) of the present invention has the formula

where Ar are phenylene and the bonding is para-. This unit is derived from reaction of the corresponding diacid chloride or dicarboxylic acid of the terephthalate with an aliphatic diamine.

The aliphatic diamines which are intended to serve as the other reagent are of the formula

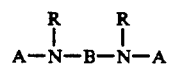

where B is hydrocarbylene, such as alkylene, $-(CH_2)_x-$ for example, ethylene, where x is an integer which varies from 2 to 12, or arylene (e.g., phenylene, naphthylene, and the like), R is alkyl such as lower alkyl, and A is a group or atom which reacts with the acid or chloride group of the terephthalate, e.g., hydrogen or trimethylsilyl. These diamines preclude strong hydrogen bonding within the resulting polymer.

One possible preferred synthetic route involves the direct condensation of the terephthalic acid chloride with diamine (A=hydrogen) using an external base (e.g., potassium hydroxide) to neutralize the hydrochloric acid by-product formed during the reaction.

A second preferred route involves the use of the disilamines (A=trimethylsilyl) with the acid chlorides without the need for an external base. This second route has certain advantages: (1) the disilamines can be readily distilled to yield the monomer in high purity; (2) there is no need to use an external base, thereby avoiding side reactions between the external base and the diacid chloride; (3) the reaction of a disilamine with an acid chloride can be carried out in a variety of solvents; and (4) the product which is eliminated during the condensation is trimethylchlorosilane which can be recycled for further use for the conversion of diamines to disilamines as described by Y. Imai in Macromolecules, Vol. 21, No. 3, March 1988.

The present invention is further illustrated by the Examples which follow.

EXAMPLES

Monomer Synthesis

The triad acid chloride (namely, bis(4-carbonylchloride phenylene) terephthalate) used in the Examples which follow was prepared according to the procedure described by Bilibin, et al., in Makromol. Chem. Rapid Commun. 6, 209–211 (1985).

The N,N-dimethylalkylenediamines that were used were prepared using the method described by Devinsky et al., in Synthesis (Communications), April 1980, pp. 303–305.

The disilamines were prepared according to the following general procedure (the synthesis of a disilamine having a spacer of twelve methylene units being given for illustration): N,N'-dimethyldodecamethylenediamine (52.37 gm, 0.229 mol), prepared according to the previously noted method of Devinsky, was placed in a flame and oven-dried glass 1,000 ml three neck round bottom flask equipped with a reflux condenser, an addition funnel, and a large magnetic stirrer. All manipulations were carried out under an argon atmosphere. To the flask was added 600 ml of dry benzene, followed by the slow addition of chlorotrimethylsilane (66.68 ml, 0.525 mol), after which the reaction vessel was heated at reflux temperature for ninety minutes. A white gel-like precipitate was formed. The reaction vessel was cooled to room temperature. To this product was then added triethylamine (97.4 ml, 0.70 mol.), and the reaction was allowed to continue at reflux for one additional day. Triethylaminehydrochloride readily precipitated from the reaction mixture. The vessel was allowed to cool to room temperature. The solution was filtered through a cannula equipped with a filter under argon pressure. To the triethylaminehydrochloride residue was added 400 ml of dry benzene. This solution was also cannulated into a 2000 ml distillation apparatus. The distillation apparatus was heated to 1000° C. to remove solvent and other volatiles at atmospheric pressure. The liquid residue was cannulated into an oven-dried, 200 ml single-neck flask equipped with an insulated eight inch Vigreux column and a short path distillation head. The desired product was distilled at 129° C. and 0.1 mm of mercury and was obtained in 81% yield. The disilamine product had the following elemental analysis, which was consistent with the calculated values: carbon—64.44 (calc.), 64.33 obtained); hydrogen—12.98 (calc.), 12.84 (obtained); and nitrogen—7.52 (calc.), 7.65 (obtained).

Analogous disilamines having alkylene spacer lengths of six and eight carbon atoms, respectively, were also prepared using this procedure.

EXAMPLES OF POLYMER PREPARATION

EXAMPLE 1

This Example relates to the synthesis of "Polymer 1A" in the Table given below.

N,N'-dimethyldodecamethylenediamine (0.88 gms, 3.8 mmol) was dissolved in 100 ml of dry chloroform and 1.71 gm (3.8 mmol) of diacid chloride was dissolved in 200 ml of dry chloroform. Then, 0.426 gm (7.6 mmol) of potassium hydroxide was dissolved in 200 ml of distilled water. The aqueous solution was first placed in a Waring blender. The two chloroform solutions were simultaneously added to one another. The resulting mixture was blended at high speed with a nitrogen purge for forty minutes. The product was precipitated in methanol and was suction filtered. The resulting polymer was extracted in a Soxhlet for one day with methanol. The polymer was then dried under vacuum.

EXAMPLE 2

This is the synthesis procedure for "Polymer 7A".

N,N'-dimethyloctamethylenediamine (0.47 gm, 2.73 mmol) was added to 5.45 ml of 1N HCL until it dissolved. This solution was further diluted with 70 ml of distilled water. An equimolar amount (1.22 gm) of diacid chloride was dissolved in 200 ml of chloroform, and 0.673 gm of potassium hydroxide was dissolved in 100 ml of distilled water. The base solution was first added to a Waring blender followed by the diamine and diacid chloride solutions, which were added simultaneously. The reaction mixture was stirred at high speed in the Waring blender for one hour under an argon purge. The polymer was precipitated in methanol, collected by filtration, extracted in a Soxhlet with methanol for one day, and then vacuum dried for one day.

EXAMPLE 3

This is the synthesis procedure for "Polymer 7B".

All manipulations had to be carried out in thoroughly dried glassware because of the sensitivity of the disilamines to moisture. A 500 ml three-neck round bottom flask was equipped with a magnetic stirrer and an addition flask. Disilamine (20.125 gm, 69.7 mmol) was weighed into the addition flask under argon. An equimolar amount (30.90 gm, 69.7 mmol) of diacid chloride was weighed and placed into the round bottom flask which had been purged with nitrogen. Two hundred milliliters of dry tetrachloroethane were added to the acid chloride solid. The tetrachloroethane did not dissolve the solid. The mixture was cooled to −300° C. The disilamine was slowly added to the round bottom flask through an addition funnel. The reaction was allowed to continue between −100° C. and −30° C. for four hours. The acid chloride had a very low solubility of approximately one gram in 100 ml in halogenated solvents at reflux. However, the acid chloride very gradually dissolved in the tetrachloroethane as it was reacted and was converted to polymer. Alter four hours, the solution was allowed to warm to room temperature. The reaction was stirred further for two days at room temperature to yield a very viscous solution. The solution was precipitated in methanol to yield a fibrous polymer. The polymer was extracted in a Soxhlet with methanol for one day and was vacuum dried. The syntheses of the polymers by the disilamine route yielded the best results at very low temperature. In most condensation polymerization reactions, the monomers, rather than the resulting polymer, have the greater solubility in the reaction medium. The polymer then precipitates as the molecular weight increases. The reaction which occurs in the present invention is unique in that the solubility behavior was opposite from what one would expect. The diacid chloride has very low solubility in the reaction solvent. As the monomer is slowly converted to polymer, all of the diacid chloride slowly enters into solution by reaction because the polymer has excellent solubility in halogenated solvents. These polymers are also soluble In polar solvents at elevated temperatures. For example, polymer obtained from Example 3 dissolved in tetrachloroethane at a ratio of 1 gm of polymer to four milliliters of solvent.

| SUMMARY OF POLYMERIZATIONS | | | | | | |
|---|---|---|---|---|---|---|
| Polymer Designation | Spacer | Temp. | Base | Solvent* | Yield | $[\eta]$** inh. |
| 1A | 12 | RT | KOH/H$_2$O | Chloroform | 42% | 0.36 |
| 2A | 10 | RT | KOH/H$_2$O | Chloroform | 64% | 0.38 |
| 3A | (75% 12, 25% 6) | RT | KOH/H$_2$O | Chloroform | 64% | 0.39 |
| 4A | (50% 12, 50% 6) | RT | KOH/H$_2$O | Chloroform | 56% | 0.38 |

-continued
SUMMARY OF POLYMERIZATIONS

| Polymer Designation | Spacer | Temp. | Base | Solvent* | Yield | $[\eta]$** inh. |
|---|---|---|---|---|---|---|
| 5A | (25% 12, 75% 6) | RT | KOH/H$_2$O | Chloroform | 46% | 0.34 |
| 6A | 6 | RT | KOH/H$_2$O | Chloroform | 39% | 0.31 |
| 7A | 8 | RT | KOH/H$_2$O | Chloroform/H$_2$O | 40% | 0.24 |
| 1B | 8 | 100° C. | — | HMPA/NMP | 28% | 0.25 |
| 2B | 8 | RT to 70° C. | — | Chloroform | 76% | 0.35 |
| 3B | 8 | RT to 100° C. | — | NMP | 65% | 0.49 |
| 4B | 8 | RT to 150° C. | — | Tetrachloroethane | 81% | 0.54 |
| 5B | 6 | RT to 150° C. | — | Tetrachloroethane | 78% | 0.45 |
| 6B | 6 | RT to 150° C. | — | Tetrachloroethane | 79% | 0.53 |
| 7B | 6 | −10 to −30° C. | — | Tetrachloroethane | 99% | 0.84 |
| 8B | (50% 12, 50% 6) | −10 to −30° C. | — | Tetrachloroethane | 98% | 1.23 |

*All polymerizations were solution polymerizations with the exception of that for polymer 7A which was an interfacial polymerization.
**Inherent viscosities were measured in TFA at 29.5° C. at 0.125 g/.25 dL.
Infrared spectra were obtained on a Perkin-Elmer 1600 Series FTIR and Varian XL-200 and XL-300 NMR spectrometers were used to obtain carbon and proton spectra for polymer characterization.

BLEND PREPARATION

Blends of nylon 6,6 and the liquid crystalline polymers previously described were made by first dissolving nylon 6,6 in trifluoroacetic acid (TFA), which had been previously dried over molecular sieves for one week to minimize hydrolysis. Blends were made in compositions ranging from 5 weight % to 50 weight % LCP. A typical procedure, which is illustrative of the general blending technique employed, is as follows: nylon 6,6 (11.25 gms) was dissolved in TFA. The LCP was then added to this solution to form a homogeneous solution. After dissolution, the solution was precipitated in methanol, and the polymer blend was collected by filtration. The polymer blend was washed with copious amounts of an aqueous sodium carbonate solution to neutralize any remaining acid and was subsequently extracted in a Soxhlet apparatus with methanol for eight hours. The blend was then extracted in a Soxhlet apparatus with water for six hours. The extracted blend was then dried in a vacuum oven for one day at 130° C., ground, and dried for an additional day.

BLEND CHARACTERIZATION

The blends were characterized by differential scanning calorimetry (DSC), thermogravimetric analysis (TGA), and mechanical testing. The DSC and TGA data were obtained on a Perkin-Elmer 7 Series instrument equipped with a DSC and TGA.

The DSC data for a blend of 50% nylon 6,6 and 50% LCP (Polymer 7A) indicated the melting of nylon 6,6 at 265° C. and the melting of the LCP between 300° C. and 310° C. This blend showed two different melting transitions, indicative of an immiscible blend. However, a thermogram of the second heating cycle contained only one broad melting transition between 190° C. and 225° C., which may be indicative of a miscible blend. The third melting cycle also revealed one melting transition which began at 180° C. In each of the three cooling cycle thermograms there was only one thermal transition for recrystallization. Because the time scale of the experiment used was short, it might be possible that the recrystallization of the LCP is slower than the time permitted in the experiment. A fourth heating-cooling cycle, was performed two months after the initial experiment using the original DSC sample. There was only one broad melting point peak between 150° C. and 200° C. It appears that when the LCP and nylon 6,6 are heated together at elevated temperatures, there was a molecular reorganization which took place, a transamidation reaction, in which the two polymers reacted to form copolymers. It is another aspect of this invention that the simple heating of an amide-containing LCP and a linear nylon can be a viable route to develop copolymers. During the first heating and cooling at 10° C./minute, the sample remained above 250° C. for ten minutes, so if this conclusion is correct, very little time was required to permit this copolymer formation. Preliminary investigation of this phenomena was described by Brubaker, et. al., in U.S. Pat. No. 2,339,237 and Beste, et. al., Journal of Polymer Science, Vol. 8, No. 4, pp. 395–407(1952). Brubaker et. al. investigated the melting of a water-soluble polyamide (polytriglycol adipamide) with a water-insoluble polyamide (polyhexamethylene adipamide) at 287° C. to yield a polymer having properties intermediate between the two homopolymers. Their data support the present concept that heating a mixture of an amide-containing LCP and a commercial nylon will yield copolymers.

MECHANICAL TESTING

The blends of this invention produced an enhancement in the mechanical properties of blends of the LCP and nylon 6,6. Such blends were prepared from solution, and a fiber was obtained by extrusion of polymer chips through a Randcastle microextruder equipped with a 1575 micron single hole die. These polymer chips were obtained from the polymer blend which was precipitated in methanol, vacuum dried for one day at 130° C., and ground in a mill. The Randcastle microextruder contained the following three temperature settings in the screw and a fourth temperature setting in the die zone.

|  | Zone 1 | Zone 2 | Zone 3 | Die block |
|---|---|---|---|---|
| Temperature: | 230° C. | 270° C. | 300° C. | 262° C. |

After take-up, the blended fiber was cold drawn at 100° C. and was subsequently hot drawn at 170° C. The following data describe the mechanical properties of these blends:

| BLENDS OF LCP (POLYMER 7B) WITH NYLON 6,6 | | | | | | |
|---|---|---|---|---|---|---|
| | Draw Ratios* | | | | | |
| LCP (%) | Cold | Hot | Total | $\sigma_b$ (MPa) | E (GPa) | $e_b$ (%) |
| 0 | — | — | — | 490 | 4.00 | 57.0 |
| 5 | 1.12 | 1.98 | 2.22 | 307 | 8.51 | 8.6 |

BLENDS OF LCP (POLYMER 7B) WITH NYLON 6,6

| LCP (%) | Draw Ratios* | | | $\sigma_b$ (MPa) | E (GPa) | $e_b$ (%) |
|---|---|---|---|---|---|---|
| | Cold | Hot | Total | | | |
| 15 | 1.38 | 1.86 | 2.57 | 348 | 14.1 | 5.8 |
| 20 | 2.18 | 1.40 | 3.05 | 362 | 15.5 | 3.7 |
| 25 | 2.33 | 2.14 | 4.99 | 352 | 21.0 | 3.0 |

*The draw ratio is the ratio of the final length divided by the initial length
$\sigma_b$: breaking tenacity
E: modulus
$e_b$: elongation at break With increasing LCP content, the blends can be increasingly drawn. High draw ratios resulted in significantly higher values for the modulus. The values for tensile strength were apparently independent of the liquid crystalline content. The value of 21.0 GPa for the modulus for the 25% blend was three times the value of moduli typically obtained for commercial grade nylon 6,6. Polarizing optical micrographs, using a Zeiss optical microscope equipped with a hot stage and, for birefringence, an Olympus Bh-2 polarizing optical microscope, for the drawn samples were highly birefringent and indicated the presence of a one phase system. Similar micrographs of the extruded fibers support the conclusion that amide interchange took place quite rapidly, resulting in a one phase system after melt processing. A DSC scan of an extruded fiber supported the presence of a one phase system resulting from copolymerization. Before extrusion, there was a clear melting of the liquid crystalline phase in the first melting cycle in. After extrusion there remained only one melting transition which occurred below that of nylon 6,6. The melting transitions of both the LCP and the nylon 6,6 were replaced after extrusion by a single melting transition below that of nylon 6,6.

The foregoing Examples and data should not be construed in a limiting sense since it is intended to set forth only certain embodiments of the present invention. The scope of protection sought is set forth in the claims which follow.

We claim:

1. A thermotropic liquid crystalline poly(ester-amide) comprising a bis(4-carbonyl phenylene) terephthalate unit and a unit derived from an N-substituted hydrocarbylenediamine of the formula

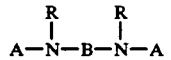

where A is a group or atom which reacts with an acid or chloride group in a terephthalate, B is selected from the group consisting of alkylene having a 2-12 carbon atoms content and arylene is selected from the group consisting of phenylene and naphthylene, and R is lower alkyl.

2. A poly(ester-amide) as claimed in claim 1 wherein the hydrocarbylene group in the diamine is a alkylene group which contains from about 2 to about 12 carbon atoms.

3. A poly(ester-amide) as claimed in claim 2 wherein the unit derived from the hydrocarbylenediamine is derived from an N,N-dialkylalkylenediamine.

4. A poly(ester-amide) as claimed in claim 3 wherein the alkyl group in the N,N-dialkyl moiety, of the N,N-dialkylalkylenediamine is methyl.

5. A blend of any of the poly ester-amide)s of claim 1 with nylon.

6. A blend of any of the poly(ester-amide)s of claim 2 with nylon.

7. A blend of any of the poly(ester-amide)s of claim 3 with nylon.

8. A blend of any of the poly(ester-amide)s of claim 4 with nylon.

9. A blend as claimed in claim 5 wherein the nylon is nylon 6.

10. A blend as claimed in claim 6 wherein the nylon is nylon 6.

11. A blend as claimed in claim 7 wherein the nylon is nylon 6.

12. A blend as claimed in claim 8 wherein the nylon is nylon 6.

13. A blend as claimed in claim 5 wherein the nylon is nylon 6,6.

14. A blend as claimed in claim 6 wherein the nylon is nylon 6,6.

15. A blend as claimed in claim 7 wherein the nylon is nylon 6,6.

16. A blend as claimed in claim 8 wherein the nylon is nylon 6,6.

* * * * *